United States Patent [19]
Fujimoto et al.

[11] Patent Number: 5,302,648
[45] Date of Patent: Apr. 12, 1994

[54] DEALCOHOLIZATION-TYPE ROOM TEMPERATURE VULCANIZING SILICONE RUBBER COMPOSITION

[75] Inventors: Tetsuo Fujimoto; Masayoshi Anzai, both of Ohta, Japan

[73] Assignee: General Electric Company, Waterford, N.Y.

[21] Appl. No.: 535,447

[22] Filed: Jun. 8, 1990

[30] Foreign Application Priority Data

Jun. 15, 1989 [JP] Japan .................. 1-152532

[51] Int. Cl.$^5$ .................................. C08K 5/16
[52] U.S. Cl. ........................... 524/200; 524/270; 524/425; 524/764
[58] Field of Search ............... 524/200, 270, 425, 764

[56] References Cited

U.S. PATENT DOCUMENTS

| | | | |
|---|---|---|---|
| 2,663,695 | 9/1957 | Perloff et al. | 524/425 |
| 2,841,504 | 7/1958 | Liggett | 523/200 |
| 4,191,670 | 3/1980 | Strauch et al. | 523/200 |
| 4,234,466 | 11/1980 | Takahashi et al. | 524/764 |
| 4,407,986 | 10/1983 | Nomura et al. | 523/200 |
| 4,454,262 | 6/1984 | Fukayama et al. | 524/425 |
| 4,477,606 | 10/1984 | Fukayama et al. | 523/200 |

*Primary Examiner*—Melvyn I. Marquis
*Assistant Examiner*—Karen A. Dean

[57] ABSTRACT

A room temperature vulcanizing silicone rubber composition comprising a polyorganosiloxane terminated with silanol groups, an alkoxysilane of the formula $R^1Si(OR^2)_3$ or its partially hydrolyzed condensate, colloidal calcium carbonate surface-treated with rosin acid, and a curing catalyst. This composition has excellent workability, and, after curing, becomes a high-strength, high-modulus rubber having excellent adhesion and resistance to humidity and hot water, and is useful as a sealing material for sealed insulating glass.

9 Claims, No Drawings

DEALCOHOLIZATION-TYPE ROOM TEMPERATURE VULCANIZING SILICONE RUBBER COMPOSITION

FIELD OF THE INVENTION

The present invention relates to a dealcoholization-type room temperature vulcanizing silicone rubber composition for sealed insulating glass sealing which can become an adhesive rubber having not only excellent workability but also high strength and high modulus and excellent moisture resistance and hot water resistance, by incorporating specific calcium carbonate into the rubber composition.

BACKGROUND OF THE INVENTION

Silicone rubber compositions which cure at room temperature by a condensation reaction to become rubber-like elastomers are generally referred to as "RTV (Room Temperature Vulcanizing) silicone rubbers". As a result of the ease in carrying out the curing reaction and various other features (i.e., the cured products have excellent heat resistance and cold resistance, do not easily undergo changes in physical properties with the change of temperature, and further do not suffer from substantial deterioration of physical properties from exposure to ozone and ultraviolet rays), the RTV silicone rubbers have been widely employed in various fields and applications including sealants for construction.

RTV silicone rubbers are mainly composed of a polyorganosiloxane as a base material, a crosslinking agent and a filler. The rubbers are classified into various categories according to the type of crosslinking reaction which is based on the crosslinking agent used and which results in different condensation reaction by-products.

The dealcoholization-type RTV silicone rubbers produce an alcohol by-product which is free from odors and corrosive action and further does not easily generate bubbles or undergo cracking on curing. These types of rubbers have been employed as sealed insulating glass sealant materials for in-plant installation types, replacing the previous on-spot installation types, and have been under study as adhesive sealant materials for general industrial uses. However, these rubbers have drawbacks in that their adhesive properties and durability are poor, that is, the strength and modulus are low, and in particular, the strength and modulus are greatly lowered and the sealing properties deteriorated under high temperature and high humidity circumstances.

Dry silica, wet silica, diatomaceous earth, ground quartz, calcium carbonate, alumina etc. are generally employed as fillers in RTV silicone compositions. The silicas are the most frequently employed fillers, and RTV silicone rubbers utilizing these can possess high strength. However the amount of filler added is greatly restricted because of the thickening properties generated when mixed with an organopolysiloxane component. The use of ground quartz and alumina does not result in high thickening properties, but the obtained strength is not as high as expected.

Further, the calcium carbonate is classified as either ground limestone or light limestone depending on whether it is natural or synthetic, and the latter is further classified into colloidal calcium carbonate and light calcium carbonate. These come in various grades according to the particle size and whether and how surface treatment has been conducted, and since the thickening properties and strength vary depending on the grade used as the filler, the calcium carbonates are appropriately selected for use according to the purpose and application.

The use of calcium carbonate as the filler in a dealcoholization-type RTV silicone rubber is known in the art. For example, the retention of the surface light release properties of a tonor-fixed roll of a copying machine is improved by combining calcium carbonate having average particle size of 10 $\mu$m or less with powdered iron oxide and powdered titanium oxide (Japanese Patent Application Laid-open No. 2439/1977); an adhesion-improved room temperature vulcanizing organopolysiloxane composition for sealing which can control the flowability, and is excellent in deep part curing properties and the cured product of which has such physical properties as high elongation and low modulus is obtained by using calcium carbonate substantially free from surface treatment and having an average particle diameter of 0.3 $\mu$m or less and a specific surface area as measured by an air transmission method of 3.0 $m^2/g$ or more (Japanese Patent Publication No. 18454/1980); and an example which imparts especially excellent heat resistance and greatly improves the change in the physical properties and the heat loss by using light calcium carbonate having a specific surface area as measured by a BET method of 1–30 $m^2/g$ and an average particle diameter of 0.3–10 $\mu$m and of a spindle shape and the surface of which has been treated with an organosilicon compound (Japanese Patent Publication No. 23940/1986).

However, although the use of calcium carbonate, when incorporated in RTV silicone rubbers, resulted in improved workability, surface release properties, adhesion etc., the RTV rubbers had low modulus and high extensibility etc., and rubbers having high strength, high modulus and low extensibility could not be obtained.

It is desirable to provide dealcoholization-type RTV silicone rubbers incorporating calcium carbonate wherein the rubbers are useful as sealants for sealed insulating glass and possess high strength, high modulus, low extensibility, adhesion and durability.

SUMMARY OF THE INVENTION

An object of the present invention is to provide dealcoholization type room temperature vulcanizing silicone rubber compositions useful as sealant materials for sealed insulating glass wherein the rubber compositions have high strength and high modulus, excellent moisture resistance and hot water resistance, and do not suffer from substantial reduction in the physical properties even under high temperature, and high humidity.

It has been discovered that the use of a specific calcium carbonate as filler, will result in rubber compositions having high strength, high modulus and excellent adhesion and will retain these characteristics for a prolonged time even under high humidity or hot water circumstances.

Thus, the present invention is based on the discovery that a silicone rubber composition possessing exceptionally high strength and high modulus together with water resistance while retaining good workability can be obtained by adding to a dealcoholization-type RTV silicone rubber composition a colloidal calcium carbonate filler having a BET specific surface area of 14.0–20.0 $m^2/g$ and an average particle size (value converted to the BET specific surface area) of 0.05-0.20 μm, the surface of the colloidal calcium carbonate having been treated with a type of resin acid, i.e., rosin acid.

DETAILED DESCRIPTION OF THE INVENTION

Accordingly, the room temperature vulcanizing silicone rubber composition of the present invention comprises:

(A) 100 parts by weight of a polyorganosiloxane in which the molecular chain is terminated with silanol groups, the polyorganosiloxane having a viscosity at 25° C. of 100-100,000 centistokes, (B) 0.1-30 parts by weight of an alkoxysilane or its partially hydrolyzed condensate, the alkoxysilane being represented by the formula: $R^1Si(OR^2)_3$ wherein $R^1$ represents a monovalent hydrocarbon group or $OR^2$, in which $R^2$ represents a monovalent hydrocarbon group, (C) 10-200 parts by weight of colloidal calcium carbonate which has a BET specific surface area of 14.0-20.0 m$^2$/g and an average particle size of 0.05-0.20 μm, the surface of the colloidal calcium carbonate having been treated with rosin acid, and (D) 0.01-5 parts by weight of a curing catalyst.

The polyorganosiloxane of component (A) of the composition of the present invention is a linear polymer terminated on both ends with silanol groups. Component (A) may further contain a branched polymer.

The organic groups attached to the silicon atoms in the diorganosiloxane structural unit in component (A) may be the same or different, and examples of such organic groups include alkyl groups such as methyl, ethyl, propyl, butyl, hexyl, dodecyl etc., alkenyl groups such as vinyl, allyl etc., aryl groups such as phenyl, tolyl etc., aralkyl groups such as benzyl, β-phenylethyl, β-phenylpropyl etc., monovalent substituted hydrocarbon groups such as 3,3,3-trifluoropropyl, chloromethyl etc., and the like. Among these, the methyl, vinyl or phenyl groups are preferred due to the ease of synthesis. Methyl groups are most preferred because the synthesis of the polymer is easier, and moreover, the viscosity is the lowest in contrast to the high degree of polymerization of the resulting polymer and also because it favorably impacts the physical properties of the cured product, i.e., a rubber elastomer. For these reasons, it is most preferred that substantially all the organic groups attached to the silicon atoms in the diorganosiloxane structural units in component (A) be methyl, but if heat resistance is required of the cured product, it is preferred that some of the organic groups attached to the silicon atoms be phenyl groups. However, it is preferred that 85% or more of the organic groups in the polymer be methyl groups for the reasons discussed above.

The polyorganosiloxane used as component (A) has a viscosity at 25° C. of 100-100,000 centistokes (cs), preferably 500-50,000 cs. With a viscosity of less than 100 cs, it is difficult to impart excellent mechanical properties to the cured product, and if the viscosity exceeds 100,000 cs, the workability of the silicone rubber is substantially deteriorated.

The alkoxysilane or its partially hydrolyzed condensate of component (B) of the composition of the present invention is essential in order for the composition to cure to an elastomer having good physical properties. The alkoxysilane is represented by the general formula $R^1Si(OR^2)_3$ wherein $R^1$ and $R^2$ are as described above.

Examples of $R^1$ include alkyl groups such as methyl, ethyl, propyl etc., aryl groups such as phenyl; alkenyl groups such as vinyl; and $OR^2$ radicals, in which $R^2$ is generally methyl or ethyl, depending on the desired hydrolyzability of $OR^2$. Examples of $R^2$ includes the same of $R^1$.

Examples of alkoxysilanes suitable as component (B) include alkyl orthosilicates such as ethyl silicate, propyl silicate etc., and their partial hydrolyzates, i.e. polyalkyl silicates; alkoxysilanes such as methyltriethoxysilane, phenyltriethoxysilane, phenyltrimethoxysilane, vinyltriethoxysilane etc., and their partial hydrolyzates. In addition, a class of alkoxysilanes well known as carbonfunctional silanes represented by the molecular formulae given below and their partial hydrolyzates are also effectively employed in the present invention. In the following description, Me and Et stand for a methyl group and an ethyl group respectively.

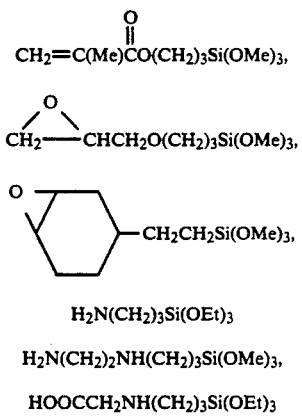

$H_2N(CH_2)_3Si(OEt)_3$ $H_2N(CH_2)_2NH(CH_2)_3Si(OMe)_3$, $HOOCCH_2NH(CH_2)_3Si(OEt)_3$

The amount of component (B) used in the composition of the present invention is 0.1-30 parts by weight per 100 parts by weight of component (A). If the amount of the component (B) is less than 0.1 part by weight, the curing of the composition is slow, whereas if the amount exceeds 30 parts by weight, the physical properties after curing are lowered.

Component (C) of the composition of this invention is critical impart to the composition the combination of properties referred to previously herein. The colloidal calcium carbonate used as component (C) has a BET specific surface area of 14.0-20.0 m$^2$/g and an average particle size of 0.05-0.20 μm, the surface of the colloidal calcium carbonate having been treated with rosin acid. If the average particle size is less than 0.05 μm, the viscosity is so high that the workability is substantially deteriorated, whereas if it exceeds 0.20 μm, excellent mechanical properties cannot be imparted to the cured product. If the BET specific surface area is less than 14.0 m$^2$/g, it is impossible to impart excellent mechanical properties to the cured product, whereas if it is exceeds 20.0 m$^2$/g, the viscosity is so high that the workability is substantially deteriorated. Further, colloidal calcium carbonate the surface of which has been treated with rosin acid gives a rubber cured product of high modulus and excellent resistance to hot humidity and hot water.

Examples of suitable calcium carbonate for use in the present invention include Homocal D, Homocal DM, Hakuenka TDD, Hakuenka IGV (all of which are available from Shiraishi Kogyo Co., Ltd.).

The amount of component (C) used in this invention is 10-200 parts by weight, preferably 50-150 parts by weight, per 100 parts by weight of component (A). If less than 10 parts by weight of the carbonate is used, it is impossible to impart excellent mechanical properties to the cured product, whereas if more than 200 parts by weight is used, the viscosity is so high that the workability is substantially deteriorated.

Methods of preparing component (C) are known. For example, there is known a method of spraying a treating agent over a dry powder of calcium carbonate so that the agent is adsorbed onto the powder and a method of adding an aqueous solution of a treating agent to an aqueous suspension of calcium carbonate and stirring them (refer to Japanese Patent Application Laid-Open Nos. 133538/1979 and 34213/1980). The latter method is preferred as the adsorption of the agent is more stable. Additionally, a method of preparing calcium carbonate grains having a small grain size like component (C) (refer to Japaense Patent Application Laid-Open No. 41299/1979) and a method of continuously preparing a powder of calcium carbonate (refer to Japaense Patent Application Laid-Open No. 39998/1978) are also known.

In accordance with the present invention, examples of the treating agent to be used in the above-mentioned treatment include salts of rosin acid such as sodium salt. In the present invention it is necessary to use rosin acid. If only fatty acids are used, the effect of the present invention could not be obtained.

The curing catalyst of component (D) of the composition of the present invention is exemplified by organometal compounds, for example, metal salts of carboxylic acids such as iron octanoate, zinc octanoate, tin octanoate, cobalt octanoate, manganese octanoate, lead octanoate, tin naphthenate, cobalt naphthenate, lead naphthenate, tin oleate, zinc stearate etc.; organotin compounds such as dibutyltin diacetate, dibutyltin dioctoate, dibutyltin dilaurate, dibutyltin oleate, diphenyltin diacetate, dibutyltin oxide, dibutyltin dimethoxide etc.; organic titanium esters such as tetrapropyl titanate, tetrabutyl titanate, tetraoctyl titanate etc.; and titanium chelate compounds such as diisopropoxy(acetylacetonato)titanium, diisopropyl-bis(ethylacetoacetato)titanium, 1,3-propylenedioxybis(acetylacetonato)titanium, 1,3-propylenedioxybis(ethylacetoacetato)titanium etc., and the like.

The amount of component (D) used in the composition is 0.01-5 parts by weight per 100 parts by weight of component (A). An amount of less than 0.01 part by weight, will not result in the expected catalytic effect, and an amount greater than 5 parts by weight will adversely affect the heat resistance of the cured product.

In addition to the above-described components (A)-(D), the composition of the present invention may further contain a filler such as diatomaceous earth, calcium carbonate not included within the scope of component (C), ground quartz, aerosol silica etc., pigments such as red oxide, titanium oxide, zinc white, ultramarine blue, etc. Further, depending on the purpose, other known polyorganosiloxanes may be used as adhesion accelerators as long as their presence does not adversely affect the excellent properties achieved in the present invention.

The composition of the present invention exhibits high strength and high modulus in the cured state, and its storage under hot humidity or in hot water for a prolonged period of time, will not result in a reduction of these properties. When utilized as a sealing material for sealed insulating glass, the composition of this invention exhibits excellent sealing properties.

The present invention is described in more detail by means of the following examples and comparative examples. All parts are by weight.

EXAMPLE 1

100 Parts of polydimethylsiloxane having a viscosity of 5,000 centistokes (cs) in which both ends of the polymer chain are terminated with silanol groups were mixed with 2 parts of phenyltrimethoxysilane, 100 parts of colloidal calcium carbonate "Hakuenka TDD" (produced by Shiraishi Kogyo Co., Ltd.), the surface of which had been treated with rosin acid and which had a BET specific surface area of 16.0 $m^2/g$ and an average particle size of 0.10 $\mu m$, 0.1 part of dibutyltin dilaurate and 0.5 part of $\gamma$-glycidoxypropyltrimethoxysilane. The resulting mixture was defoamed to obtain a composition within the scope of the present invention.

This composition thus obtained was evaluated for adhesive properties in accordance with JIS A 5758, item 6-13, as follows. The composition was coated on float glass according to JIS A 5758, item 6-8-3. Then, this was allowed to stand in an atmosphere of 20° C. and 55% relative humidity (RH) for 7 days, and further at 30° C. for 7 days to form a cured product. This product was subjected to an initial tensile bonding test at a rate of 50 mm/min, and also subjected to a similar tensile test after immersing in hot water of 80° C. for 7 days or 14 days. The results are shown in Table 1.

COMPARATIVE EXAMPLE 1

A composition for comparative purposes was prepared in a manner similar to that prepared in Example 1 except that the calcium carbonate used in Example 1 was replaced by the filler set forth in Table 1 in the amount indicated in the table.

A tensile test similar to that performed in Example 1 was carried out for this composition. The results are shown in Table 1.

EXAMPLE 2

100 Parts of polydimethylsiloxane having a viscosity of 30,000 cs in which both ends of the molecular chain are terminated with silanol groups was mixed with 1.5 parts of ethyl polysilicate, 80 parts of colloidal calcium carbonate "Homocal D" (produced by Shiraishi Kogyo Co., Ltd.), and 0.1 part of dioctyltin dilaurate to obtain a composition within the scope of the present invention.

This composition was cured in a manner similar to that followed in Example 1. A similar tensile bond test was conducted for the cured product at the initial stage and also after allowing it to stand under hot humidity circumstances at 50° C. and 95% RH for 100 days. The results are shown in Table 2.

COMPARATIVE EXAMPLES 4-6

Compositions for comparative purposes were prepared in a manner similar to that prepared in Example 2 except that the calcium carbonate used in Example 2 was replaced by calcium carbonates not includable as component (C) to the present invention. These carbonates are set forth in Table 2.

Similar tensile bonding tests for these compositions were conducted. The results are shown in Table 2.

EXAMPLE 3

100 Parts of polydimethylsiloxane having a viscosity of 80,000 cs in which both ends of the molecular chain had been terminated with silanol groups was mixed with 2 parts of methyltrimethoxysilane, 120 parts of rosin acid-treated colloidal calcium carbonate "Hakuenka IGV" (Shiraishi Kogyo Co, Ltd.) having a BET specific surface area of 19.5 m²/g and an average particle size of 0.08 μm and 0.1 part of dibutyltin diacetate. The resulting mixture was defoamed to provide a composition within the scope of the present invention.

A cured product of this composition was prepared in a manner similar to that in Example 1. Using this cured product, a similar tensile bonding test was conducted at the initial stage and also after allowing the product to stand in hot water of 60° C. for 200 days. The cured product exhibited physical properties, i.e. initial stage: 50% modulus 11.2 kgf/cm², maximum tensile stress 17.4 kgf/cm², elongation 80%; after immersing in hot water of 60° C. for 200 days: 50% modulus 10.8 kgf/cm², maximum tensile stress 15.9 kgf/cm², elongation 90%.

While the invention has been described in detail and with reference to specific embodiments thereof, it will be apparent to one skilled in the art that various changes and modifications can be made therein without departing from the spirit and scope thereof.

TABLE 1

| Filler Amount Incorporated | Example 1 Hakuenka TDD 100 parts | | | Comparative Example 1 Ground Quartz*1) 100 parts | | | Comparative Example 2 Diatomaceous Earth*2) 100 parts | | | Comparative Example 3 Fumed Silica Treated with Monomethyltrichlorosilane*3) | | |
|---|---|---|---|---|---|---|---|---|---|---|---|---|
| | 50% Modulus kgf/cm² | Max Tensile Stress kgf/cm² | Elongation | 50% Modulus kgf/cm² | Max Tensile Stress kgf/cm² | Elongation | 50% Modulus kgf/cm² | Max Tensile Stress kgf/cm² | Elongation | 50% Modulus kgf/cm² | Max Tensile Stress kgf/cm² | Elongation |
| Initial Stage | 12.1 | 18.6 | 90 | 6.8 | 10.3 | 90 | 4.5 | 8.1 | 80 | 3.2 | 11.9 | 130 |
| After Immersing in Hot Water at 80° C. for 7 Days | 11.9 | 18.4 | 90 | 2.0 | 4.8 | 150 | 1.5 | 3.9 | 120 | 2.6 | 9.4 | 150 |
| After Immersing in Hot Water at 80° C. for 14 Day | 11.6 | 18.1 | 80 | 1.7 | 2.5 | 70 | 1.3 | 1.9 | 30 | 1.8 | 7.6 | 90 |

*1)"Crystallite VX-R" produced by Tatsumori Co., Ltd.
*2)"Cellite 219" produced by Johns-Mansville Corp.
*3)"MT-10" produced by Tokuyama Soda Co., Ltd.

TABLE 2

| Filler Amount Incorporated | Example 2 Homocal D 80 parts | | | Comparative Example 4 Calcium Carbonate*1 Surface Not treated SA*4: 14.0 m²/g PS*5: 0.19μ 80 parts | | | Comparative Example 5 Calcium Carbonate*2 Treated with Fatty Acid SA: 14.0 m²/g PS: 0.17μ 80 parts | | | Comparative Example 6 Calcium Carbonate*3 Treated with Fatty Acid & Sulfonic acid SA: 15.0 m²/g PS: 0.15μ 80 parts | | |
|---|---|---|---|---|---|---|---|---|---|---|---|---|
| | 50% Modulus kgf/cm² | Max Tensile Stress kgf/cm² | Elongation | 50% Modulus kgf/cm² | Max Tensile Stress kgf/cm² | Elongation | 50% Modulus kgf/cm² | Max Tensile Stress kgf/cm² | Elongation | 50% Modulus kgf/cm² | Max Tensile Stress kgf/cm² | Elongation |
| Initial Stage | 11.8 | 17.5 | 80 | 5.2 | 8.1 | 80 | 3.9 | 12.4 | 190 | 3.8 | 8.5 | 100 |
| 50° C. 95% RH After 100 Days | 10.9 | 16.9 | 90 | 0.8 | 3.1 | 60 | 2.8 | 9.6 | 220 | 1.1 | 3.5 | 70 |

*1)"Hakuenka A" produced by Shiraishi Kogyo Co., Ltd.
*2)"Vigot-10" produced by Shiraishi Kogyo Co., Ltd.
*3)"Mc-T" produced by Maruo Calcium Co., Ltd.
*4)SA: Specific Surface Area (BET)
*5)PS: Average Particle Size

What is claimed is:

1. A room temperature vulcanizing silicone rubber composition comprising:
   (A) 100 parts by weight of a polyorganosiloxane in which the molecular chain is terminated with silanol groups, the polyorganosiloxane having a viscosity at 25° C. of 100-100,000 centistokes,
   (B) 0.1-30 parts by weight of an alkoxysilane or its partially hydrolyzed condensate, the alkoxysilane being represented by the formula: $R^1Si(OR^2)_3$ wherein $R^1$ represents a monovalent hydrocarbon group or $OR^2$, in which $R^2$ represents a monovalent hydrocarbon group,
   (C) 10-200 parts by weight of colloidal calcium carbonate which has a BET specific surface area of 14.0-20.0 m²/g and an average particle size of 0.05-0.20 μm the surface of the colloidal calcium carbonate having been treated with rosin acid, and
   (D) 0.01-5 parts by weight of a curing catalyst.

2. The composition according to claim 1 wherein the silicon atoms in the polyorganosiloxane of component (A) are attached to organic groups selected from alkyl groups, alkenyl groups, aryl groups, aralkyl groups, or monovalent substituted hydrocarbon groups.

3. The composition according to claim 2 wherein the organic groups are methyl groups, vinyl groups, or phenyl groups.

4. The composition according to claim 3 wherein the organic groups are methyl groups.

5. The composition according to claim 1 wherein the viscosity of the polyorganosiloxane of component (A is 500–50,000 centistokes.

6. The composition according to claim 1 wherein $R^1$ is an alkyl group, a phenyl group, a vinyl group or $OR^2$.

7. The composition according to claim 1 wherein $R^2$ is a methyl group or an ethyl group.

8. The composition according to claim 1 wherein the amount of component (C) is 50-150 parts by weight per parts by weight of component (A).

9. The composition according to claim 1 wherein the curing catalyst of the component (D) is a metal salt of a carboxylic acid; an organotin compound; an organic titanium ester or a titanium chelate compound.

* * * * *

UNITED STATES PATENT AND TRADEMARK OFFICE
CERTIFICATE OF CORRECTION

PATENT NO. : 5,302,648

DATED : Apr. 12, 1994

INVENTOR(S) : Tetsuo Fujimoto; Masayoshi Anzai, both of Ohta, Japan

It is certified that error appears in the above-indentified patent and that said Letters Patent is hereby corrected as shown below:

Cover page, first column [73] Assignee:

Please delete "General Electric Company, Waterford, New York" and enter in place thereof --Toshiba Silicone Co. Ltd., Tokyo, Japan--.

Signed and Sealed this

Second Day of April, 1996

Attest:

BRUCE LEHMAN

Attesting Officer

Commissioner of Patents and Trademarks